United States Patent
Ko

(10) Patent No.: US 7,983,136 B2
(45) Date of Patent: Jul. 19, 2011

(54) RECORDING MEDIUM FOR STORING VERSION INFORMATION FOR MAINTAINING RECORDING AND/OR REPRODUCING COMPATIBILITY, AND METHOD AND APPARATUS FOR MANAGING THE SAME

(75) Inventor: Jung-wan Ko, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 12/183,879

(22) Filed: Jul. 31, 2008

(65) Prior Publication Data

US 2008/0316886 A1    Dec. 25, 2008

Related U.S. Application Data

(63) Continuation of application No. 11/104,521, filed on Apr. 13, 2005, now Pat. No. 7,420,904, which is a continuation of application No. 09/650,858, filed on Aug. 29, 2000, now Pat. No. 7,046,605.

(60) Provisional application No. 60/214,452, filed on Jun. 28, 2000.

(51) Int. Cl.
    *G11B 7/00* (2006.01)
(52) U.S. Cl. .................. 369/124.07; 369/53.2
(58) Field of Classification Search .......... None
    See application file for complete search history.

(56) References Cited

U.S. PATENT DOCUMENTS

| | | | |
|---|---|---|---|
| 5,878,020 | A | 3/1999 | Takahashi |
| 6,330,215 | B1 | 12/2001 | Lim |
| 6,560,403 | B1 | 5/2003 | Tanaka et al. |
| 6,600,716 | B1 | 7/2003 | Kondo |
| 6,868,054 | B1 | 3/2005 | Ko |
| 7,046,605 | B1 | 5/2006 | Ko |
| 7,065,022 | B2 | 6/2006 | Ko |
| 7,088,660 | B2 | 8/2006 | Ko |
| 7,092,336 | B2 | 8/2006 | Ko |
| 7,142,493 | B2 | 11/2006 | Ko |
| 7,286,460 | B2 | 10/2007 | Ko |
| 7,336,578 | B2 | 2/2008 | Ko |

OTHER PUBLICATIONS

U.S. Appl. No. 11/104,521, filed Apr. 13, 2005, Jung-wan Ko, Samsung Electronics Co., Ltd.

*Primary Examiner* — Paul Huber
(74) *Attorney, Agent, or Firm* — NSIP Law, PC

(57) ABSTRACT

A method of recording read/write compatibility information on an optical disc and a recording medium employing the method. Extended part version information, latest part version having recording capability, and latest part version having reproducing capability are stored in n.xy form on 6 bytes of a reserved zone of a physical format information zone of the optical disc. A recording/reproducing apparatus to record extended part version information on a reserved zone of a physical format information zone of a recording medium. The recording/reproducing apparatus has a base part version and a comparing unit to determine recording/reproducing compatibility with a recording medium having a detailed extended part version stored in a reserved zone of a physical format information zone.

12 Claims, 6 Drawing Sheets

| | b15 | b12 b11 | b7 | b3 | b0 |
|---|---|---|---|---|---|
| RBP0,RBP1 | IDENTIFIER | RESERVED | PRIMARY DIGIT | FIRST SUB-DIGIT | EXTENDED PART VERSION |
| RBP2,RBP3 | IDENTIFIER | RESERVED | PRIMARY DIGIT | FIRST SUB-DIGIT | LATEST RECORDING COMPATIBLE PART VERSION |
| RBP4,RBP5 | IDENTIFIER | RESERVED | PRIMARY DIGIT | FIRST SUB-DIGIT | LATEST REPRODUCING COMPATIBLE PART VERSION |

FIG. 2

| | b15   b12 | b11         b7 | b7         b3 | b3         b0 |
|---|---|---|---|---|
| RBP0,RBP1 | RESERVED | INTEGER | FIRST DECIMAL PLACE | SECOND DECIMAL PLACE |
| RBP2,RBP3 | RESERVED | INTEGER | FIRST DECIMAL PLACE | SECOND DECIMAL PLACE |
| RBP4,RBP5 | RESERVED | INTEGER | FIRST DECIMAL PLACE | SECOND DECIMAL PLACE |

EXTENDED PART VERSION

LATEST RECORDING COMPATIBLE PART VERSION

LATEST REPRODUCING COMPATIBLE PART VERSION

FIG. 4

| | b15    b12 | b11    b7 | b7    b3 | b3    b0 | |
|---|---|---|---|---|---|
| RBP0, RBP1 | IDENTIFIER | RESERVED | PRIMARY DIGIT | FIRST SUB-DIGIT | EXTENDED PART VERSION |
| RBP2, RBP3 | IDENTIFIER | RESERVED | PRIMARY DIGIT | FIRST SUB-DIGIT | LATEST RECORDING COMPATIBLE PART VERSION |
| RBP4, RBP5 | IDENTIFIER | RESERVED | PRIMARY DIGIT | FIRST SUB-DIGIT | LATEST REPRODUCING COMPATIBLE PART VERSION |

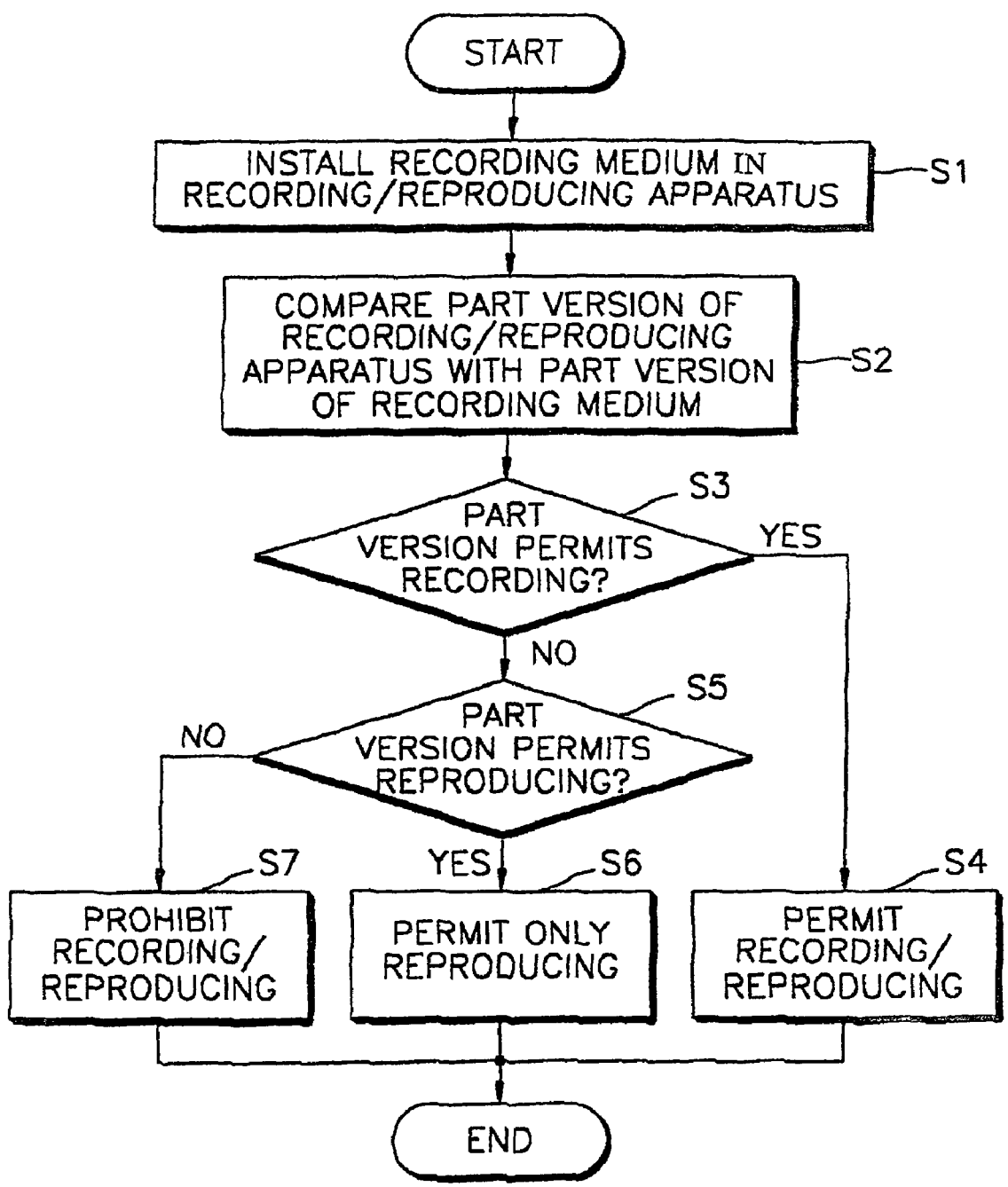

RECORDING MEDIUM FOR STORING VERSION INFORMATION FOR MAINTAINING RECORDING AND/OR REPRODUCING COMPATIBILITY, AND METHOD AND APPARATUS FOR MANAGING THE SAME

CROSS-REFERENCE TO RELATED APPLICATIONS

This application is a continuation of U.S. patent application Ser. No. 11/104,521 filed Apr. 13, 2005, now U.S. Pat. No. 7,420,904 now allowed, which is a continuation of U.S. patent application Ser. No. 09/650,858 filed Aug. 29, 2000, now U.S. Pat. No. 7,046,605, which claims the benefit of U.S. Provisional Application No. 60/214,452, filed Jun. 28, 2000, the disclosures of which are incorporated herein by reference.

BACKGROUND OF THE INVENTION

1. Field of the Invention

The present invention relates to an optical recording medium and recording/reproducing from the optical recording medium, and more particularly, to an optical recording medium for storing part version information for determining whether or not recording compatibility and/or reproducing compatibility can be maintained when data is recorded and updated on/reproduced from the optical recording medium, and a method and apparatus for managing the part version information.

2. Description of the Related Art

A recording/reproducing apparatus and a recording medium comply with a specification set at any given time, but due to the addition of new functions, and improvements in the performance of functions, the specification changes. The specification is changed in order to maintain compatibility with existing recording/reproducing apparatuses or recording media, but in some cases, partial compatibility is lost in order to extend functions or improve performance.

In general, a recording medium (such as an optical disc), which complies with specifications, has areas for storing a variety of information which represent the physical/logical structure and characteristics of the recording medium, and such information includes information on allocation on the physical recording medium, information on recording/reproducing characteristics, information for managing defects, information on the organization of logical recording spaces, etc.

A control information zone which records this information not only has a zone for recording this information, but also a reserved zone, which enables the addition of information related to characteristics of the recording medium or recording/reproducing apparatus in accordance with newly appearing functions or improvement in performance.

However, when a specification is revised due to these additional functions and improvements, compatibility may not be maintained. Furthermore, handling newly added information in an existing recording medium and recording/reproducing apparatus becomes another problem.

In order to solve these problems, the digital versatile disc (DVD) specification makes it a rule to record part version information on a disc. As shown in FIG. 1, this information is recorded in the first byte in the physical format information of a control data block in the lead-in zone of the disc.

FIG. 1 illustrates part version information of the existing DVD. An ordinary DVD has a lead-in zone which is a data zone for helping recording/reproducing in the starting part of a disc. This lead-in zone has a control data block zone which can record control information. This control data block zone is again divided into a physical format information zone, a disc manufacturer information zone, and a contents provider information zone.

In the existing digital versatile disc-read only memory (DVD-ROM), digital versatile disc-random access memory (DVD-RAM), etc., part version information is recorded in BP0, the first byte in the physical format information zone as shown in FIG. 1. The first byte BP0 is divided into two 4-bit pieces of information, one for book type, which indicates the type of a specification book, and the other for a part version, which indicates the part version of a specification book. A disadvantage of this arrangement is that only 4 bits can be used in expressing all part versions, thus only limited versions can be expressed. That is, 4 bits can represent only 16 different part versions which are presented in the form of n.x.

Meanwhile, when a disc which can record/update or reproduce data is installed in a recording/reproducing apparatus, the part version in a physical format information zone is read and then it is determined whether or not the part version can be recorded/updated or reproduced in the recording/reproducing apparatus. Such a determination can be made because the drive of the apparatus has the part version which was a base in designing the recording/reproducing apparatus, and the drive also has information on part versions that have compatibility with the recording/reproducing apparatus (among all part versions that had been known until the recording/reproducing apparatus was made).

This arrangement is disadvantageous because the part version shown in FIG. 1 only contains part versions that had been in existence at the time the corresponding recording medium was made, and therefore may not be compatible with part versions revised after the time of manufacturing.

The same holds true for information on the physical format information zone. When new data is recorded (due to revision) in a reserved zone, or the physical format information zone, it is unclear whether the recording/reproducing apparatus will be compatible with the revised specification.

In a normal reproduction-dedicated disc, no fatal errors (such as erasing recorded information) will occur when it is determined that a zone is a physical format information zone reserved by the specification at the time of designing the reproducing apparatus. Therefore, a method is used which ignores reserved physical formation information and the like. This is done to minimize booting time for reading or writing in a recording medium at initialization. Also, even when certain data exists in the zone, the reproducing apparatus cannot determine what operations to perform.

However, ignoring information in the reserved zones can cause problems. When the information in the physical format information zone (determined to be a reserved zone by the specification of a disc) defines other characteristics of recording/reproducing, the difference between characteristics in recording/reproducing can cause the recordation of wrong information, the loss of recorded information, updating failure, or loss of existing recorded information.

For example, when recording prevention information for data is recorded in a reserved physical format information zone, a recording/reproducing apparatus having a previous specification cannot recognize this recording prevention information, and therefore, recorded data can be erased or updated even when the user sets a protection mode by using recording prevention information.

SUMMARY OF THE INVENTION

Accordingly, it is an object of the present invention to provide a recording medium for storing extended version information to determine in a recording/reproducing apparatus whether or not recording/updating or reproducing can be performed on the recording medium which is made in compliance with a newly revised specification.

It is another object to provide a recording medium for storing the latest part version that can maintain recording/updating compatibility and the latest part version that can maintain reproducing compatibility, when part versions are recorded so that a recording medium having an updated specification can correctly record/update or reproduce data in a recording/reproducing apparatus having an existing specification.

It is another object to provide a managing method for correctly operating a recording/reproducing apparatus without damaging user data or without reproducing wrong information, making the recording/reproducing apparatus determine whether or not a recording medium for recording/updating or reproducing can be handled with compatibility, using extended part version information recorded on the recording medium.

It is another object to provide a managing method for reducing time in reading and writing data on a recording medium by processing the reserved zone in a control information zone, based upon extended part version information recorded on the recording medium.

It is another object to provide an apparatus for recording/reproducing without damaging user data or without reproducing wrong information by determining whether or not a recording medium for recording/updating or reproducing can be handled with compatibility, using extended part version information.

Additional aspects and/or advantages of the invention will be set forth in part in the description which follows and, in part, will be obvious from the description, or may be learned by practice of the invention.

The foregoing objects of the present invention are achieved by providing a method of recording compatibility information on a recording medium, comprising providing a physical format information zone having a reserved zone, and recording extended part version information in the reserved zone of the physical format information zone. The extended part version information comprises a detailed extended part version, a latest part version having recording compatibility, and a latest part version having reproducing compatibility. The detailed extended part version, latest part version having recording compatibility, and latest part version having reproducing compatibility are in the form n.xy.

The above objects of the present invention may also be achieved with a recording medium comprising a physical format information zone having a reserved zone and extended part version information in the reserved zone. This extended part version information comprises a detailed extended part version, a latest part version having recording compatibility, and a latest part version having reproducing compatibility, all recorded in the form n.xy. The reserved zone is 6 bytes in size, and the detailed extended part version, latest part version having recording compatibility, and latest part version having reproducing compatibility are each 2 bytes in size.

The above objects of the present invention may also be achieved with a method of determining compatibility between a recording medium and a recording/reproducing apparatus, comprising installing the recording medium in the recording/reproducing apparatus, comparing a base part version of the recording/reproducing apparatus with a detailed extended part version stored in a reserved zone of a physical format information zone of the recording medium, and determining recording compatibility based upon comparing the base part version with the detailed extended part version. This method further comprises comparing the base part version with a latest part version having a recording compatibility, in order to determine the recording compatibility. This method further comprises comparing the base part version with a latest part version having a reproducing compatibility, to determine the reproducing compatibility.

The above objects of the present invention may also be achieved with a recording/reproducing apparatus, comprising a control means to record extended part version information on a reserved zone of a physical format information zone of a recording medium.

The above objects of the present invention may also be achieved with a recording/reproducing apparatus having a base part version that receives a recording medium having a detailed extended part version stored in a reserved zone of a physical format information zone. A comparing unit compares the base part version with the detailed extended part version in the reserved zone of the recording medium to determine recording and reproducing compatibility between the recording medium and the recording/reproducing apparatus.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates part version information for maintaining recording and/or reproducing compatibility according to the present invention;

FIG. 4 is a block diagram of an optical recording/reproducing apparatus to which the present invention is applied.

DETAILED DESCRIPTION OF THE EMBODIMENTS

Figure 1:
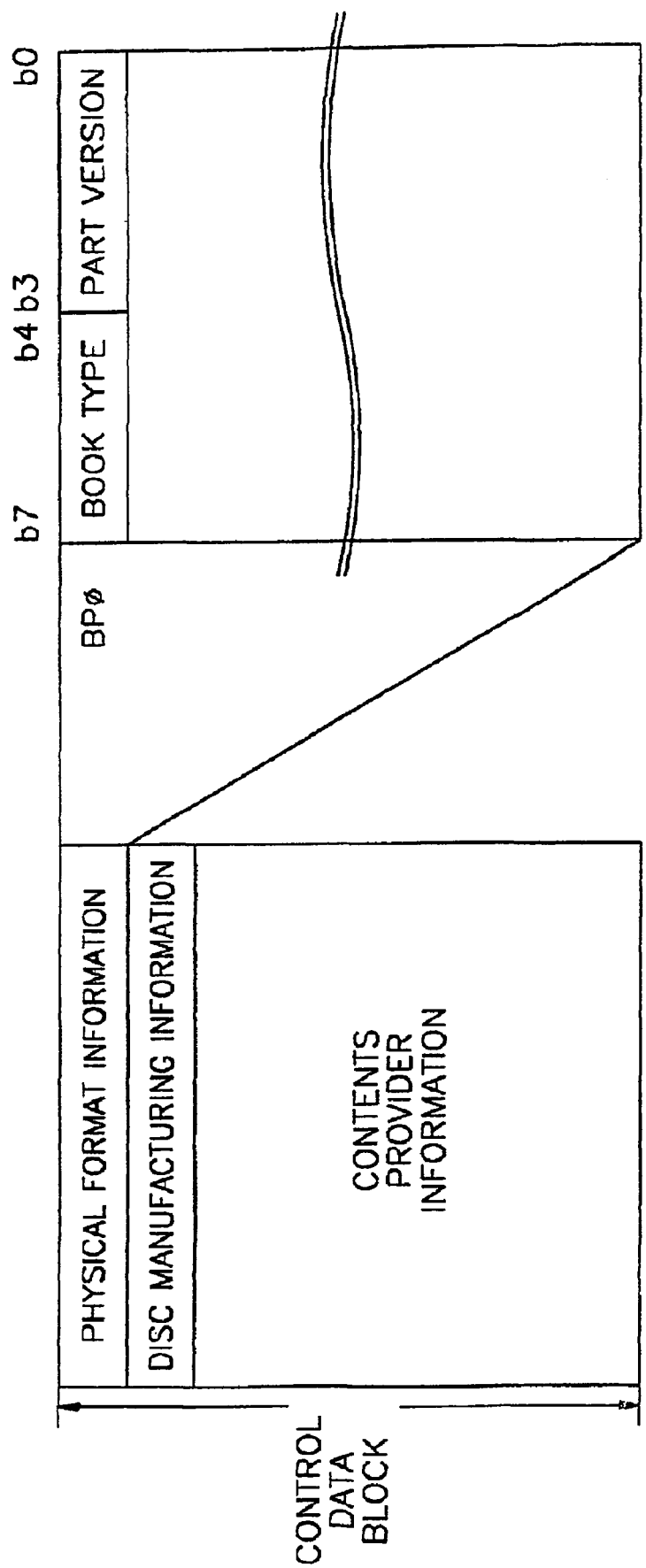
FIG. 1 illustrates part version information in the existing digital versatile discs (DVD)

Reference will now be made in detail to the present preferred embodiments of the present invention, examples of which are illustrated in the accompanying drawings, wherein like reference numerals refer to like elements throughout.

FIG. 2 illustrates part version information for maintaining recording and/or reproducing compatibility according to the present invention.

In order to solve the problem that the 4 bits in the physical format information zone of FIG. 1 are not enough to express all part versions, part values may also be defined in other locations. The value of these 4 bits indicates that the part version is defined in another location, namely the location of an extended part version shown in FIG. 2.

By using data in a reserved zone that is not used in the existing physical format information zone, extended part version information is recorded. An extended part version includes:

1) a detailed extended part version;
2) the latest part version having recording (write) compatibility; and
3) the latest part version having reproducing (read) compatibility.

The marking method of a part version according to the present invention uses 6-byte reserved bytes that are not used in a zone for recording physical format information in the existing DVD specification. A detailed extended part version is recorded on the first two reserved bytes (RBP0, RBP1), which correspond to BP17, BP 18 of the physical format information zone. Within these bytes, the highest 4 bits (b12-15) are allotted as reserved bits. In the next 4 bits (b8-b11), the integer part of the part version is written in hexadecimal numbers, and in the next 4 bits (b4-b7), the first decimal place of the part version is written in hexadecimal numbers. In the lowest 4 bits (b0-b3), the second decimal place of the part version is written in hexadecimal numbers. The advantage of this marking method is that more detailed specifications can be marked compared to the existing 4-bit marking method.

The latest part version having recording (write) compatibility is written in RBP2 and RBP3, and the latest part version having reproducing (read) compatibility is written in RBP4 and RBP5, both using the same marking method. (Reserved byte positions RB2-RB5 correspond to BP19-BP22 of the physical format information zone).

As an example of a specification expressed according to this marking method, part version 2.03 is expressed in hexadecimal '0203h'. Therefore, while the existing method expresses a part version in the form of n.x, the present invention expresses an extended part version n.xy. Here, n represents a specification change, x represents a specification change having no compatibility, and y represents a minor change having recording/reproducing compatibility, for example, the addition of an additional function. In FIG. 2, a new part version is defined, including an extended part version, the latest part version having reproducing compatibility, and the latest part version having recording compatibility. However, the present invention permits many variations, for example, a part version having only an extended part version, and no latest part version reproducing or latest part version recording information.

In order to assure compliance with changing industry specifications, b0-b15 are set to '0000h' if a part version extension is not available, or does not contain any functional change. If the second decimal place is not available, or does not contain any functional change, then b0-b3 are set to '1111h'. This will keep the disc within specification if the industry format book changes in the future.

For information on the newly defined part version, the reserved zone that is not used in the physical format information zone can be used. For example, the 6 bytes from the 17th byte to the 22nd byte in the physical format information zone can be used. Thus, RBP0 in FIG. 2 corresponds to BP17 of the physical format information zone, RBP1 corresponds to BP18, etc.

The latest part version having recording compatibility indicates that the corresponding recording medium, which was manufactured based upon the specification defined in an extended part version, can record and update data, maintaining compatibility with a recording/reproducing apparatus, which was manufactured based upon the latest part version having recording compatibility.

The latest part version having reproducing compatibility indicates that the corresponding recording medium, which was manufactured based upon the specification defined in an extended part version, can correctly read recorded data, maintaining compatibility with a recording/reproducing apparatus, which was manufactured based upon the latest part version having reproducing compatibility.

Therefore, when a recording medium having an arbitrary part version is installed in a recording/reproducing apparatus which was manufactured based upon a specification having a predetermined part version, the apparatus operates based upon the part version which was a base of the recording/reproducing apparatus, the detailed part version of the recording medium, the latest part version having recording compatibility, and the latest part version having reproducing compatibility.

That is, when the base part version of the recording/reproducing apparatus is a version prior to the latest part version having recording compatibility, writing is prohibited to prevent damaging data or errors. When the base part version of the recording/reproducing apparatus came later than the latest part version having recording compatibility with the recording medium, recording and updating can be performed.

The same operation applies with respect to determining reproducing compatibility.

Figure 3A:
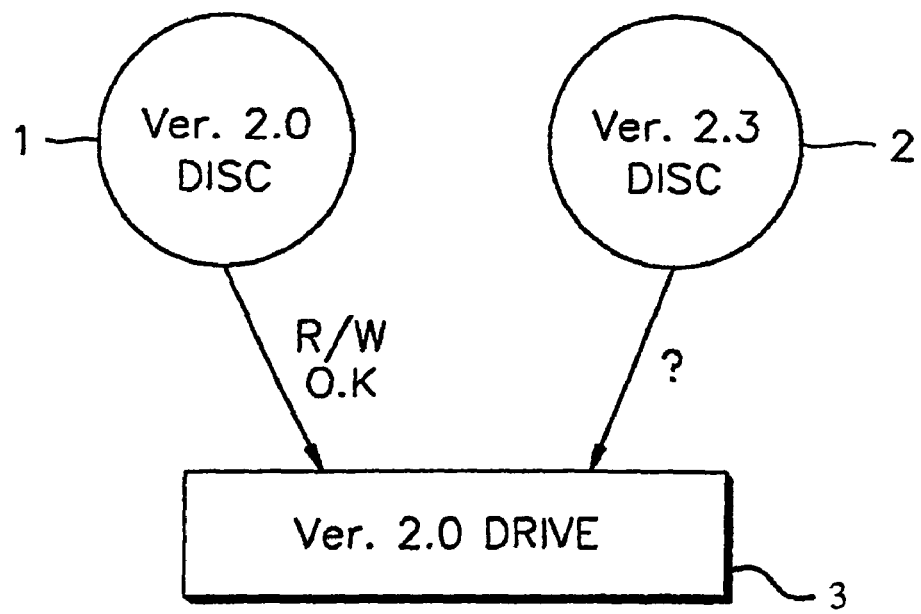
FIG. 3A illustrates the reading and writing compatibility between a disc in which part version information is recorded by the existing method, and a drive for determining the part version information.
Figure 3B:
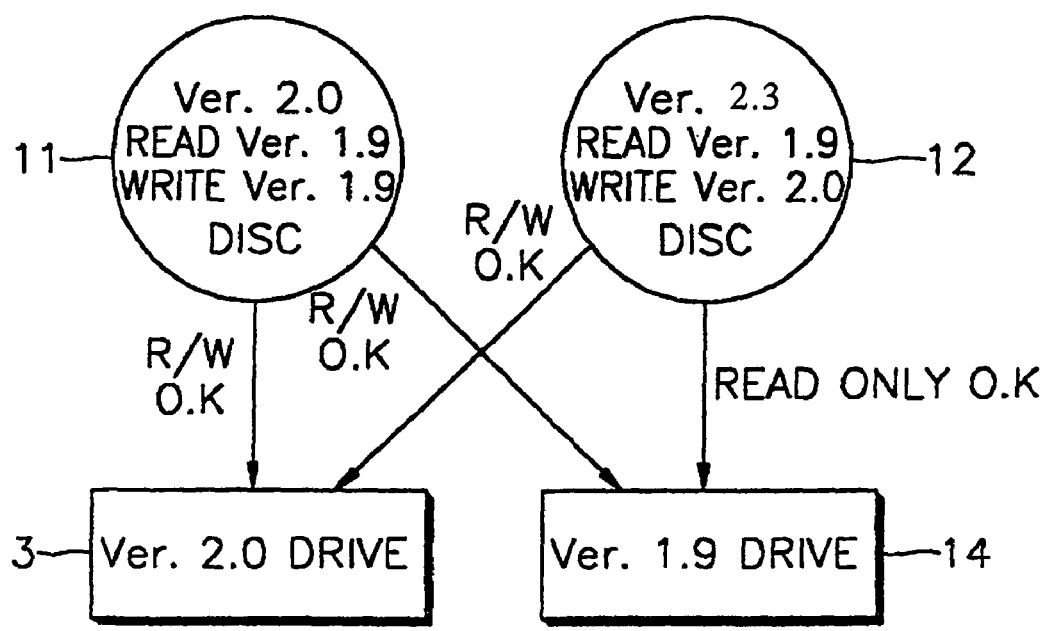
FIG. 3B illustrates the reading and writing compatibility between a disc, in which part version information for maintaining recording and/or reproducing compatibility according to the present invention is recorded, and a drive for determining the part version information.

FIG. 3A illustrates the reading and writing compatibility between a disc, in which part version information is recorded by the existing method, and a drive for determining the part version information. FIG. 3B illustrates this same reading and writing compatibility when the part version information is recorded according to the present invention. That is, in the prior art, when a disc 1 with part version 2.0 is installed in a drive 3 with part version 2.0, reproducing (reading) and recording (writing) data on/from the disc 1 can be performed. However, when the disc 2 with part version 2.3 is installed in drive 3 with part version 2.0, it is unclear whether or not the recording medium has compatibility with the drive.

However, as shown in FIG. 3B, in the present invention, when a disc 11 with extended part version 2.0, a latest reproducing (read) compatible part version of 1.9, and a latest recording (write) compatible part version of 1.9, is installed in a drive 13 with part version 2.0, or in a drive 14 with part version 1.9, it is clear that reproducing and recording data on/from the disc 11 can be performed. Furthermore, when a disc 12 with extended part version 2.3, whose latest part version having reproducing compatibility is 1.9, and whose latest part version having recording compatibility is 2.0 is installed in the drive 13 whose part version is 2.0, it is clear that recording and reproducing data on/from the disc 12 can be performed, while the disc 12 is installed in the drive 14 whose part version is 1.9, it is clear that reproducing data from the disc 12 can be performed but recording data on the disc 12 cannot be performed.

FIG. 4 is a block diagram of an audio/video (A/V) data recording/reproducing apparatus 170 to implement the present invention. The function of the apparatus can be divided into recording and reproducing. Also, a recording medium according to the present invention can be designed so that reproducing compatibility can be determined when the medium is installed in a reproducing apparatus having only a reproducing function.

In recording, an A/V codec and/or host interface 110 compresses and encodes, in a predetermined compression scheme, an A/V signal input from the outside, and supplies information on the size of the compressed data. A digital signal processor (DSP) 120 receives the compressed A/V data from the A/V codec and/or host interface 110, adds additional data for error correction code (ECC) processing, and modulates the data in a predetermined modulation scheme. A high frequency amplifier (referred to as RF AMP) 130 converts the modulated data supplied from the DSP 120 into an RF signal. A pick-up unit 140 records the RF signal supplied from the RF AMP 130 onto a disc installed on a turntable. Servo unit 150 receives information required for servo control from a system controller 160 and stably performs a servo function for the installed disc.

When data stored on the disc is reproduced, the pick-up unit 140 picks up data from the disc in the form of an optical signal, and the data is extracted from the optical signal. The RF AMP 130 converts the optical signal into an electrical signal, and extracts a servo signal and modulated data in order to perform a servo function. The DSP 120 demodulates the modulated data supplied from the RF AMP 130 in a scheme corresponding to the modulation scheme which was used in modulation, and performs ECC to correct errors and to remove additional data. The servo unit 150 receives information required for servo control from the RF AMP 130 and the system controller 160, and stably performs the servo function. The A/V codec and/or host interface 110 decodes compressed A/V data supplied from the DSP 120 and outputs an A/V signal. The system controller 160, which supplies an interface to a user, controls the entire system.

When the disc is initialized, the system controller 160 generates the extended part version, the latest part version having reproducing compatibility, and the latest part version having recording compatibility with the disc installed in a recording/reproducing apparatus. The system controller 160 then records this information on the reserved zone of the physical format information zone in the control data block of the disc through the DSP 120, the RF AMP 130, and the pick-up unit 140.

When data is recorded/updated, the system controller 160 controls the recording operation by determining permission or prohibition of recording/updating data, based upon the extended part version and the latest part version having recording compatibility, and then informs a user of the result of this determination through a user interface (not shown).

Likewise, when data is reproduced, the system controller 160 controls the reproducing operation by determining permission or prohibition of reproducing data, based on the extended part version and the latest part version having reproducing compatibility, and then informs the user of the result of this determination through the user interface.

Figure 5:
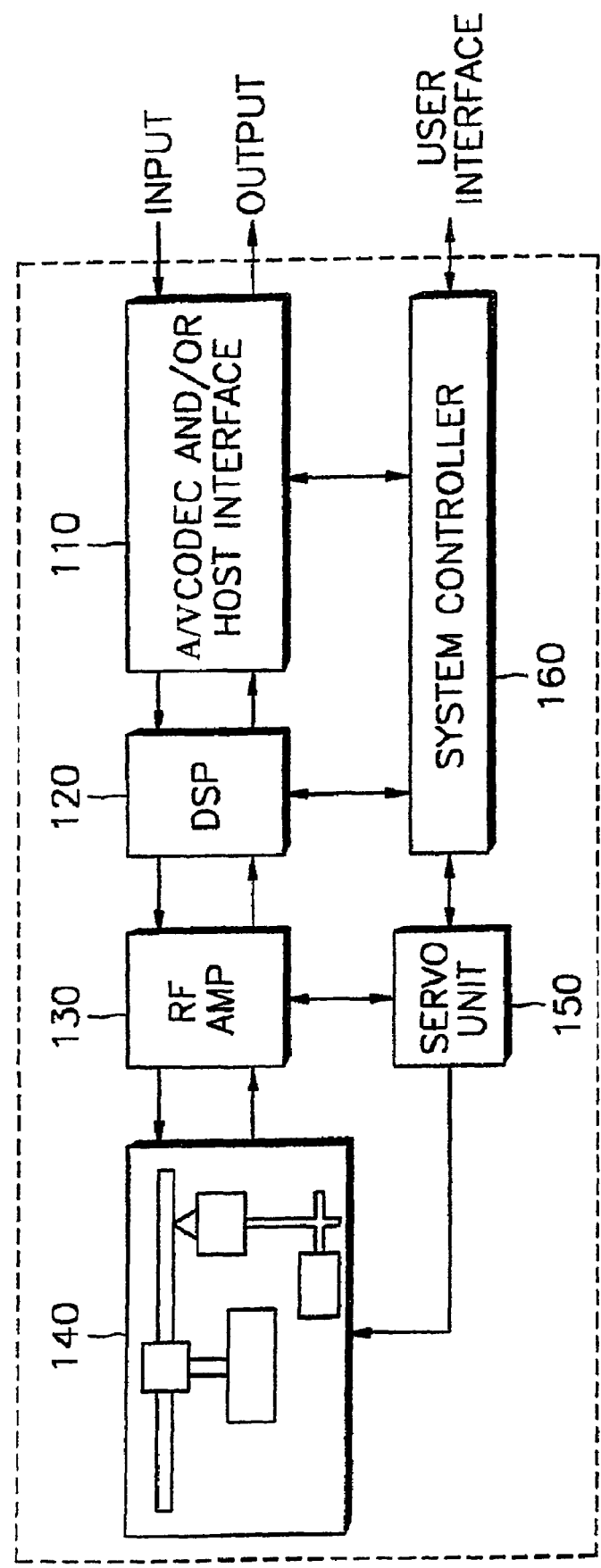
FIG. 5 is a flowchart showing an embodiment of a method of managing part version information for maintaining recording/reproducing compatibility according to the present invention.

FIG. 5 is a flowchart showing an embodiment of a method of managing part version information for maintaining recording/reproducing compatibility according to the present invention.

In step S1, a recording medium (a disc) is installed in a recording/reproducing apparatus. In step S2, the base part version at the time of manufacturing of the recording/reproducing apparatus is compared with the extended part version stored in the physical format information zone of the recording medium. In step S3, it is determined whether or not the comparison in step S2 indicates that the part versions have recording compatibility. When the base part version of the recording/reproducing apparatus is equal to or later than the latest part version having recording compatibility stored in the recording medium, recording/updating/reproducing operations are permitted in step S4. When the result of step S3 indicates that the base part version has no recording compatibility, it is determined whether or not the base part version has reproducing compatibility in step S5. When the base part version of the recording/reproducing apparatus is equal to or later than the latest part version having reproducing compatibility in the recording medium, only a reproducing operation is permitted in step S6. At this point, a step may be added in which a user is informed that recording cannot be performed.

When the result of S5 indicates the base part version has neither recording compatibility nor reproducing compatibility, recording/reproducing operations are prohibited in step S7. At this point, a step may be added in which a user is informed that recording/reproducing cannot be performed.

Though the embodiments related to a DVD-ROM and a DVD-RAM are explained above, the present invention can be applied to the specifications of all DVDs that can record or reproduce data.

As described above, the present invention maintains compatibility with the method for managing part version defined in the current DVD specifications, and safely ignores information in a reserved zone in a control information zone which a recording/reproducing apparatus cannot read. By doing so, the present invention reduces booting time between the first action of a disc in a recording/reproducing apparatus, and the time when the recording/reproducing apparatus starts to read or write data.

Also, the present invention enables accurate determination of compatibility between a recording/reproducing apparatus having a previous part version and a recording medium having a new part version. This maximizes recording/reproducing compatibility between a recording/reproducing apparatus and a recording medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording compatibility information on a recording medium having a physical format information area including a reserved zone and an unreserved zone, the method comprising:
   recording extended part version information in the reserved zone of the physical format information area;
   wherein the extended part version information includes a detailed extended part version comprising a primary digit recorded in the reserved zone.

2. The method of claim 1, wherein the recording of the extended part version information further comprises recording a latest part version having recording compatibility with a recording/reproducing apparatus of a given specification level in the reserved zone.

3. The method of claim 2, wherein the recording of the extended part version information further comprises recording a latest part version having reproducing compatibility with a recording/reproducing apparatus of a given specification level in the reserved zone.

4. The method of claim 3, wherein the recording of the latest part version having recording compatibility with the recording/reproducing apparatus, and the recording of the latest part version having reproducing compatibility with the recording/reproducing apparatus, each further comprise recording a primary digit in the reserved zone.

5. The method of claim 4, wherein the recording of the detailed extended part version, the recording of the latest part version having recording compatibility with the recording/reproducing apparatus, and the recording of the latest part version having reproducing compatibility with the recording/reproducing apparatus each further comprise recording a first sub-digit immediately after the respective primary digit.

6. The method of claim 4, further comprising recording the primary digit and the first sub-digit in the form of n.x, where:
n represents a specification change, and
x represents a specification change having no compatibility with the recording/reproducing apparatus.

7. The method of claim 6, further comprising:
recording non-extended part version information in the unreserved zone of the physical format information area, wherein the non-extended part version information indicates that the extended part version information is recorded in a different location.

8. A method of recording compatibility information on a recording medium having a physical format information area including a reserved zone and an unreserved zone, the method comprising:
recording extended part version information in the reserved zone of the physical format information area in the form of n.xy,
wherein:
n represents a specification change,
x represents a specification change having no compatibility with a recording/reproducing apparatus, and
y represents a minor change having recording/reproducing compatibility with the recording/reproducing apparatus.

9. The method of claim 8, further comprising:
recording non-extended part version information in the unreserved zone of the physical format information area, wherein the non-extended part version information indicates that the extended part version information is recorded in a different location.

10. The method of claim 8, wherein the extended part version information further comprises a detailed extended part version.

11. The method of claim 10, wherein the extended part version information further comprises a latest part version having recording compatibility with the recording/reproducing apparatus of a given specification level.

12. The method of claim 11, wherein the extended part version information further comprises a latest part version having reproducing compatibility with the recording/reproducing apparatus.

* * * * *